United States Patent Office 3,647,853
Patented Mar. 7, 1972

3,647,853
CARBONATES OF ETHER AND HYDROXY
SUBSTITUTED FATTY NITRILES
Marwan R. Kamal, Dhahran, Saudi Arabia, and Robert C. Kuder, Excelsior, Minn., assignors to General Mills, Inc.
No Drawing. Filed Apr. 25, 1969, Ser. No. 819,442
Int. Cl. C07c 12/34; C08g 22/20
U.S. Cl. 260—463
10 Claims

ABSTRACT OF THE DISCLOSURE

Ether carbonate dinitriles of the formula:

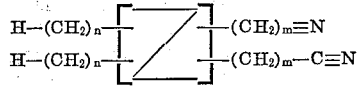

where Z is

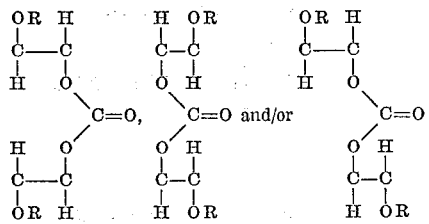

where $n$ is 4 to 19, $m$ is 0 to 15, the sum of $n$ and $m$ is 13 to 19 and R is a monovalent organic radical. Diamines and diisocyanates derived therefrom with the latter being useful for preparing polymers.

---

The present invention relates to new ether carbonate dinitriles. More particularly, it relates to such ether carbonate dinitriles prepared from certain ether and hydroxy substituted fatty nitriles and phosgene.

The new dinitriles of the present invention have the structural formula:

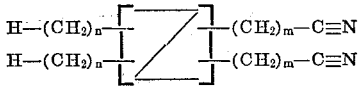

where Z is

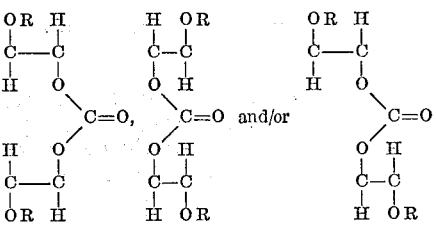

where $n$ is 4 to 19, $m$ is 0 to 15, the sum of $n$ and $m$ is 13 to 19, and R is a monovalent organic radical. The sum of the whole integers $m$ and $n$ is preferably 15. R is preferably a monovalent hydrocarbon radical of 1 to about 20 carbon atoms.

Our new ether carbonate dinitriles are useful as intermediates (via the nitrile groups) in the preparation of diacids, diesters, diamines and the like. The diamines, for example, are useful for preparing diisocyanates which in turn can be reacted with a variety of organic compounds containing two or more active hydrogens to yield polymers having utility as coatings, moldings and the like.

The ether carbonate dinitriles of our invention can be prepared by the reaction of phosgene with an ether and hydroxy substituted fatty nitrile. The starting ether and hydroxy substituted fatty nitriles are prepared by the reaction of a monohydroxy compound with an epoxy substituted fatty nitrile. The epoxy substituted fatty nitriles can be prepared in a number of known ways from monoethylenically unsaturated fatty nitriles of 16 to 22 carbon atoms. The preparation of the nitriles from the corresponding fatty acids and ammonia is also well known. This preparation and the conditions useful in the same are set forth in "Fatty Acids And Their Derivatives" by A. W. Ralston, 1948, pp. 620–625 (John Wiley & Sons, Inc.). The useful monoethylenically unsaturated aliphatic monobasic carboxylic acids which can be converted to the mono-nitriles and then to the starting epoxy substituted mono-nitriles can be represented by the following: 9-hexadecenoic (palmitoleic), 7-hexadecenoic, 2-hexadecenoic, 2-heptadecenoic, 2-octadecenoic, 3-octadecenoic, 4-octadecenoic, 5-octadecenoic, 6-octadecenoic (pertrolselinic), 7-octadecenoic, 8-octadecenoic, 9-octadecenoic (oleic, elaidic), 10-octadecenoic, 11-octadecenoic (vaccenic), 12-octadecenoic, 2-nonadecenoic, 9-eicosenoic (gadoleic), 11-eicosenoic, 13-docosenoic (erucic), 11-docosenoic (cetoleic) and the like. The oxidation of the mono-nitriles to the epoxy substituted nitriles is readily accomplished with mild oxidizing agents, preferably peracetic acid. The epoxy substituted nitriles can also be prepared according to the procedure of U.S. Pat. 2,756,242.

The epoxy substituted fatty nitrile is then converted to an ether and hydroxy substituted nitrile by reaction with a monohydroxy compound. Such reaction (or etherification) is preferably carried out in the presence of an acid catalyst. Sulfuric acid is one preferred catalyst. A wide variety of monohydroxy compounds can be utilized. Representative of such are: aliphatic alcohols including methanol, ethanol, propanol, isopropanol, butanol, pentanol, hexanol, octanol, 2-ethylhexanol, nonanol, decanol, dodecanol, hexadecanol, octadecanol, and the like; phenols such as phenol, p-nonyl phenol, o-cresol, other alkyl substituted phenols, and the like; cycloaliphatic alcohols such as cyclohexanol, and alkyl substituted cyclohexanols; and aryl substituted aliphatic alcohols such as benzyl alcohol, and alkyl substituted benzyl alcohols. The alkyl substituents on the various classes of alcohols and phenols can be branched or straight chained and preferably contain from 1 to 12 carbon atoms. The monohydroxy compounds can also contain inert substituents such as Cl, nitro and the like but it is preferred that the resulting R group be unsubstituted hydrocarbon. The preferred monohydroxy compounds are the saturated aliphatic alcohols of 1 to about 18 carbon atoms.

The described ether and hydroxy substituted fatty nitriles are then reacted with phosgene to produce the new ether carbonate dinitriles of the present invention. Such phosgenation can be carried out by dissolving the ether and hydroxy substituted fatty nitriles in an organic solvent such as toluene, benzene, pyridine (also an acid acceptor) and the like or mixtures thereof followed by the slow addition of phosgene gas, preferably at temperatures below about 25° C.—i.e. 0 to 25° C.

The following examples are illustrative of the invention without being limiting.

EXAMPLE I

To a solution of 664 g. of a mixture of approximately equal parts of 9-methoxy-10-hydroxystearonitrile and 10-methoxy-9-hydroxystearonitrile in 700 g. dry toluene and 240 g. dry pyridine was added 131 g. of phosgene gas over a period of four hours while maintaining the temperature at 5–10° C. The reaction mixture was allowed to warm to 20° C. over a one hour period and then diluted with water. The resulting top layer was separated, washed with saturated salt water, and stripped free of toluene on a rotary evaporator, leaving 693 g. of crude product which was filtered to remove a small amount of white solid. The resulting product analyzed 4.35% nitrogen (theoretical 4.32%) and the infrared spectrum thereof showed absorption maxima at 4.46μ (nitrile C≡N), 5.74μ (carbonate C=O), 7.89μ (carbonate C—O) and 9.09μ (ether C—O). The product comprised a mixture of position isomers having the formulae:

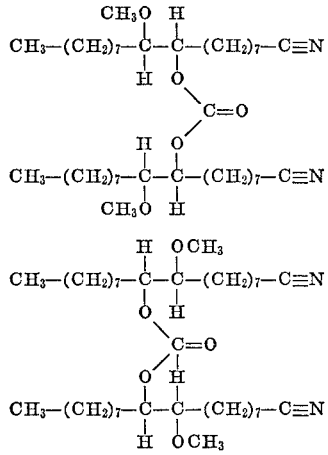

and

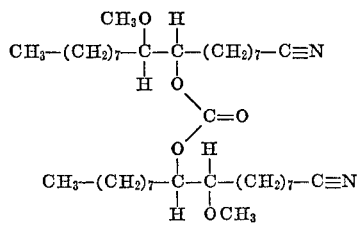

These position isomers can be separated (as well as the isomers of the examples to follow) such as by chromatography. However, there is ordinarily no reason to do so since the compounds are functionally equivalent.

EXAMPLE II

Example I is essentially repeated using a mixture of 9-octyloxy - 10 - hydroxystearonitrile and 10-octyloxy-9-hydroxystearonitrile. The resulting product corresponds to that of Example I except that the methoxy groups are replaced by octyloxy group (—O—CH$_2$(CH$_2$)$_6$CH$_3$).

EXAMPLE III

Example I is essentially repeated using a mixture of 9-cetyloxy - 10 - hydroxystearonitrile and 10-cetyloxy-9-hydroxystearonitrile. The resulting product corresponds to that of Example I except that the methoxy groups are replaced by cetyloxy groups (—O—CH$_2$(CH$_2$)$_{14}$CH$_3$).

EXAMPLE IV

Example I is essentially repeated using a mixture of 9-phenoxy - 10 - hydroxystearonitrile and 10-phenoxy-9-hydroxystearonitrile. The resulting product corresponds to that of Example I except that the methoxy groups are replaced by phenoxy groups

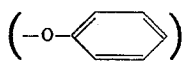

As indicated above, our new dinitriles are particularly useful for preparing diamines and then diisocyanates. The diisocyanates find use in the preparation of polymers by reaction with organic compounds containing active hydrogens.

The dinitriles are converted to the diamines by hydrogenation. The hydrogenation is carried out in the presence of ammonia utilizing a hydrogenation catalyst such as Raney cobalt or Raney nickel. The diamines are then converted to the diisocyanates by the conventional procedure of reacting phosgene therewith and then decomposing the intermediate carbamyl chlorides by raising the reaction temperature. The reaction is preferably carried out in an organic solvent such as toluene or xylene.

The utility of our new dinitriles is accordingly illustrated by the following description.

The following examples serve to illustrate the preparation of the diamines without being limiting.

EXAMPLE A

A mixture of 160 g. of the ether carbonate dinitrile as prepared in Example I, 160 g. of methanol, 24.0 g. Raney active cobalt catalyst and 150 ml. liquid ammonia was heated in a stirred autoclave for 4 hours at 145–150° C. under hydrogen at 810–1130 p.s.i. The reaction mixture was then cooled to room temperature, filtered and stripped free of solvent on a rotary evaporator. The resulting crude product (157.0 g.) was a dark red brown liquid. The above procedure was essentially repeated three more times giving a total of 552 g. of crude product with an amine number of 168. This combined crude product was purified by distillation through a falling-film molecular still to give a yellow liquid with an amine number of 169 (theoretical 171). The product comprised a mixture of position isomers having the formulae:

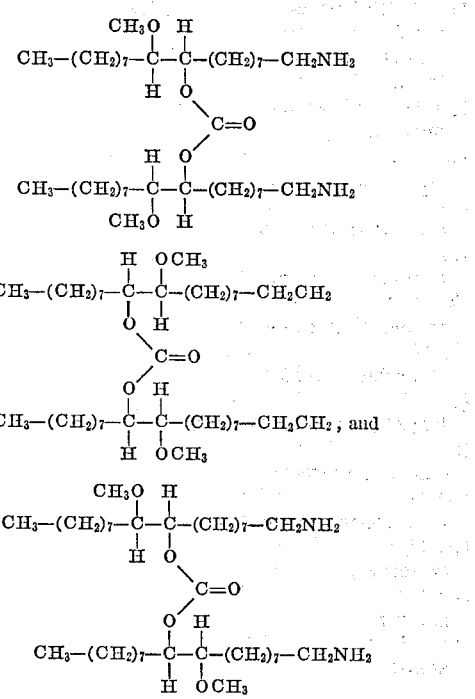

These position isomers can be separated (as well as the isomers of the examples to follow) such as by chromatography. However, there is ordinarily no reason to do so since the compounds are functionally equivalent.

EXAMPLE B

Example A is essentially repeated using the ether carbonate dinitrile of Example II. The resulting product corresponds to that of Example A except that the methoxy groups are replaced by octyloxy groups

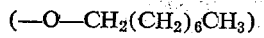

(—O—CH$_2$(CH$_2$)$_6$CH$_3$)

EXAMPLE C

Example A is essentially repeated using the ether carbonate dinitrile of Example III. The resulting product corresponds to that of Example A except that the methoxy groups are replaced by cetyloxy groups

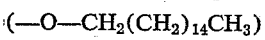

(—O—CH$_2$(CH$_2$)$_{14}$CH$_3$)

EXAMPLE D

Example A is essentially repeated using the ether carbonate dinitrile of Example IV. The resulting product corresponds to that of Example A except that the methoxy groups are replaced by phenoxy groups

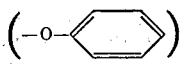

The following examples serve to illustrate the preparation of the diisocyanates without being limiting.

EXAMPLE E

To a solution of 318 g. phosgene in 800 ml. dry xylene was added a solution of 244 g. of the ether carbonate diamine as prepared in Example A in 200 ml. dry xylene over a period of one hour. During this time the reaction temperature increased to 30° C. The temperature was then increased to 115° C. in 2⅓ hours. Nitrogen gas was then bubbled through the reaction mixture and the xylene distilled off to a pot temperature of 175° C. at atmospheric pressure. The residue was then held at 175° C. for 15 minutes under full vacuum of a water aspirator. The resulting dark viscous liquid was distilled through a falling-film still at a jacket temperature of 200° C. to give a yellow liquid. Analysis and infrared spectrum showed that the product had a nitrogen content of 4.0% (theoretical 3.96%), an NCO content of 11.4% (theoretical 11.9%) and absorption maxima at $4.42\mu$ (NCO), $5.75\mu$ (carbonate C=O), $7.92\mu$ (carbonate C—O) and $9.08\mu$ (ether C—O). It comprised a mixture of position isomers of the formulae:

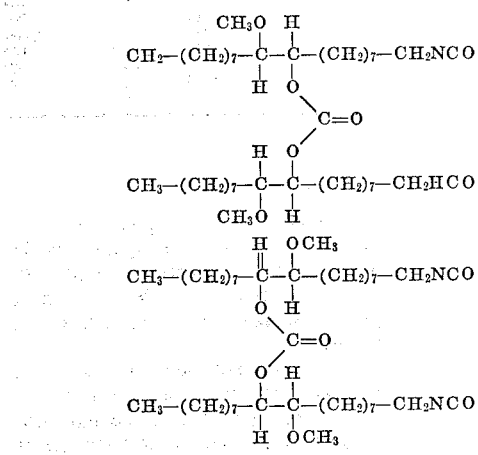

and

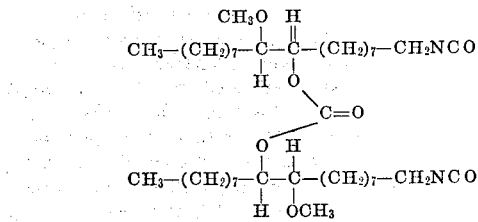

These position isomers can be separated (as well as the isomers of the examples to follow) such as by chromatography. However, there is ordinarily no reason to do so since the compounds are functionally equivalent.

EXAMPLE F

Example E is essentially repeated using the ether carbonate diamine of Example B. The resulting product corresponds to that of Example E except that the methoxy groups are replaced by octyloxy groups

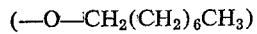

EXAMPLE G

Example E is essentially repeated using the ether carbonate diamine of Example C. The resulting product corresponds to that of Example E except that the methoxy groups are replaced by cetyloxy groups

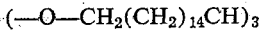

EXAMPLE H

Example E is essentially repeated using the ether carbonate diamine of Example D. The resulting product corresponds to that of Example E except that the methoxy groups are replaced by phenoxy groups

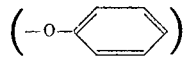

As indicated above the diisocyanates are particularly valuable for the preparation of polymers by reaction with compounds bearing at least two active hydrogen atoms as determined by the Zerewitinoff method. The Zerewitinoff test is described by Kohler in J. Am. Chem. Soc., 49, 3181 (1927). Such polymers are useful especially as coatings for a variety of substrates.

In general, the active hydrogen atoms of compounds reactive with the diisocyanates are attached to carbon, oxygen, nitrogen or sulfur atoms. Compounds containing the following groups will have active hydrogen atoms: primary amino, secondary amino, carboxyl, diazoamino, hydrazino, hydrazo, hydrazono, hydroxyamino, hydroxyl imido, imino, and mercapto. Most often these active hydrogen atoms are attached to oxygen, nitrogen, or sulfur atoms; thus they will be a part of groups such as —OH, —SH, —NH—, —NH$_2$, —CO$_2$H, —CONH$_2$, —CONHR where R represents an organic radical, —SO$_2$OH, —SO$_2$NH$_2$, and —CSNH$_2$. Examples of suitable types of compounds include water, hydrogen sulfide, ammonia, hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thios having two or more —SH grouups; polyamines including both aromatic, aliphatic and heterocyclic diamines, triamines, tetramines and the like; as well as mixtures thereof. Of course, compounds which contain two or more different groups within the above-defined classes may also be used such as, for example, amino alcohols which contain an amino group and a hydroxyl group, amino alcohols which contain two amino groups and one hydroxyl group, aminoacids and the like. Further illustrative classes and specific organic compounds containing active hydrogen atoms useful for preparing polymers are described immediately hereinbelow.

Any suitable polyester may be used and may contain terminal hydroxyl groups, terminal carboxylic acid groups, amino groups or the like. Moreover, the polyester may be a polyester amide which was prepared by condensing an amino alcohol containing both free amino groups and free hydroxyl groups with the other components used in the preparation of polyesters. The polyester may be prepared by reacting a polycarboxylic acid or hydroxy carboxylic acid with polyhydric alcohols. It is also possible to use a mixture of polyhydric alcohols and polyamines such as ethylenediamine, polyethylenediamine, 1,4-butylenediamine and the like. Amines such as bis-(2-aminoethyl)ether or amino carboxylic acids such as glycine, alanine, valine, phenylalanine, hydroxypyroline and the like may also be used. The polyesters may contain hetero atoms in addition to the ester groups including oxygen, sulfur nitrogen and the like in the chain. Moreover, the radicals making up the polyester may be either saturated or unsaturated and may contain double or triple bonds as well as modifying radicals of saturated or unsatuurated fatty acids such as oleic acid or fatty alcohols such as oleyl alcohol and the like.

Any suitable polycarboxylic acid may be used in the preparation of the polyesters such as, for example, oxalic acid, malonic acid, succinic acid, glutaric acid, adipic acid, pimelic acid, suberic acid, azelaic acid, sebacic acid, brassylic acid, maleic acid, fumaric acid, glutaconic acid, alpha-hydromuconic acid, beta-hydromuconic acid, alpha-butyl-alpha-ethyl-glutaric acid, alpha,beta-diethyl-succinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, and the like. Any suitable polyhydric alcohol may be used in the preparation of the polyesters such as, for example, ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerine, trimethylolpropane, 1,3,6-hexanetriol, triethanolamine, pentaerythritol, sorbitol and the like.

Any suitable polyhydric polyalkylene ether may be used as the active hydrogen containing compound such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohols such as glycerine, trimethylolpropane, pentaerythritol and the like in the preparation of the polyhydric polyalkylene ethers so that some branching exists in the product. Generally speaking, it is advantageous to condense from about 5 to about 30 moles of alkylene oxide per functional group of the trihydric or higher polyhydric alcohol. The polyhydric polyalkylene ethers may be prepared by any known process such as, for example, the process disclosed in 1859 by Wurtz and in Encyclopedia of Chemical Technology, volume 7, pages 257 to 262, published by Interscience Publishers, Inc. (1951), or in U.S. Pat. 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Pats. 2,862,972 and 2,900,368.

Any suitable polyhydric alcohol may be used as the active hydrogen containing compound such as, for example, alkane diols such as, for example, ethylene glycol, 1,3-propylene glycol, 1,2-propylene glycol, 1,4-butylene glycol, 1,3-butylene glycol, 1,5-pentanediol, 1,4-butanediol, 1,3-pentanediol, 1,6-hexanediol, 1,7-heptanediol, 2,2-dimethyl-1,3-propanediol, 1,8-octanediol and the like including 1,20-eicosanediol and the like; alkene diols such as, for example, 2-butene-1,4-diol, 2-pentene-1,5-diol, 2-hexene-1,6-diol, 2-heptene-1,7-diol and the like; alkyne diols such as, for example, 2-butyne-1,4-diol, 1,5-hexadyne-1,6-diol and the like; alkane triols such as, for example, 1,3,6-hexanetriol, 1,3,7-heptane triol, 1,4,8-octane triol, 1,6,12-dodecane triol and the like; alkene triols such as 4-hexene-1,3,6-triol and the like; alkyne triols such as 2-hexyne-1,4,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3-hexane trithiol and the like; alkene thiols such as for example, 2-butene-1,4-dithiol and the like; alkyne thiols such as, for example, 3-hexyne-1,6-dithiol and the like.

Any suitable polyamine may be used including, for example, aromatic polyamines such as, for example, p-amino aniline, 1,5-diamino naphthalene, 2,4-diaminotoluene, 1,3,5-benzene triamine, 1,2,3-benzene triamine, 1,4,5,8-naphthalene tetramine and the like; aliphatic polyamines such as, for example, ethylenediamine, 1,3-propylenediamine, 1,4-butylenediamine, 1,3-butylenediamine, diethylenetriamine, triethylenetetramide, 1,3,6-hexane-triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazole, piperazine and the like.

One especially preferred group of amines useful for preparing polymers are polyamines having the primary amine groups thereof blocked by ketimine or aldimine groups. The reaction of carbonyl compounds with the primary amine groups can be illustrated as follows:

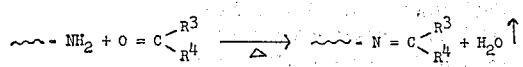

The useful carbonyl compounds may have the following theoretical structural formula

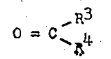

where $R^3$ and $R^4$ are organic radicals, are each substantially inert to the ketimine or aldimine formation reaction and are preferably hydrogen or short chain alkyl groups (1 to 4 carbon atoms). Preferred compounds are low molecular weight ($C_2$–$C_6$) aldehydes or ketones that are volatile so that an unreacted excess thereof may easily be removed by conventional distillation practices when the reaction is completed. Such volatile compounds are also preferred so that when the blocked polyamine is mixed with the diisocyanate and exposed to moisture, the freed aldehyde or ketone can be easily removed from the reaction mixture. Examples of preferred carbonyl compounds include such aldehydes and ketones as acetone, methyl ethyl ketone, methyl n-butyl ketone, methyl tert-butyl ketone, ethyl isopropyl ketone, acetaldehyde, propionaldehyde, butyraldehyde, isobutyraldehyde, and the like (i.e. including hexanone and hexanal). The polyamines to be blocked preferably have the structure $$H_2N(R^2N)_nR^2NH_2$$

or $$H_2N(R^2NH)_nR^2NH_2$$

where $R^2$ is a difunctional aliphatic group containing from 2–48 carbon atoms, $R^1$ is an aliphatic group containing 1–24 carbon atoms and $n$ is an integer of from 0–20. Representative $R^1$ radicals are methyl, propyl, butyl, decyl, hexadecyl, hexenyl, octenyl, tridecenyl, octadecyl, undecynyl and the like. Inert or non-interfering groups such as Cl, nitro and the like may be present on $R^1$ and/or $R^2$.

Any suitable reaction product of a phenol with an alkylene oxide yielding a compound containing active hydrogens may be used such as, for example, those disclosed in U.S. Pat. 2,843,568, such as for example, the reaction product of hydroquinone with ethylene oxide to give a polyalkylene arylene ether glycol having a molecular weight above about 750 or other polyalkylene arylene ether glycols disclosed in said patent.

Any suitable reaction product of a phenol-aldehyde resin with an alkylene oxide may be used such as, for example, a novolac having the formula

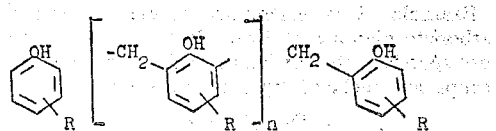

wherein $n$ is 1 to 5 and R is a lower alkyl radical such as methyl, ethyl, propyl, butyl, tertiary butyl and the like reacted with an alkylene oxide such as those disclosed above for the preparation of the polyhydric polyalkylene ethers.

Any suitable reaction product of an amine with an alkylene oxide may be used such as, for example, the reaction product of an alkylene oxide with a tolylenediamine such as, 2,4-tolylenediamine, 2,6-tolylenediamine or the like, a diphenylmethane diamine such as 4,4'-diaminodiphenylmethane or the like, xylylene diamine, as well as alkylene diamines such as, for example, ethylenediamine, propylenediamine, 1,4-butylenediamine, hexamethylenediamine and the like including 1,10-dodecane diamine.

Any suitable phenol may be used such as, for example, 2,2-bis(p-hydroxyphenyl)propane (bisphenol A) and the like.

Any suitable polyamide may be used such as, for example, those obtained by reacting adipic acid with hexamethylenediamine and the like.

Any suitable polyacetal may be used such as, for example, the reaction product of formaldehyde or other suitable aldehydes with a polyhydric alcohol such as those disclosed above for use in the preparation of the hydroxyl polyester.

Other alcohol compounds which do not necessarily fit within any of the previously set forth classes of compounds and which nevertheless contain active hydrogen containing groups which are quite suitable for the production of the polymers are pentaerythritol, sorbitol, triethanolamine, mannitol, N,N,N',N'-tetrakis(2-hydroxypropyl)ethylenediamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as for example, carbomethoxy, carboethoxy and the like; dialkyl amino such as, for example, dimethylamino, diethylamino, dipropylamino, methylethylamino and the like; mercapto, carbonyl, thiocarbonyl, phosphoryl, phosphato and the like.

Other substances which can be used include nature substances such as castor oil and the like.

The molar proportions of the diisocyanate and the compounds bearing Zerewitinoff active hydrogen atoms can vary widely. Those skilled in the art can determine the proportions of reactants best suited for a particular purpose. For example, when making polyurethane elastomers, one often uses approximately equimolar amounts of glycol and the diisocyanate. Preferably, the active hydrogen containing compound will be used in a molar ratio to the diisocyanate of 1:10 to 10:1.

The polymers can be prepared by reacting the diisocyanate and the active hydrogen containing compound at subatmospheric, atmospheric or superatmospheric pressure. Atmospheric pressure is preferred. The reaction can be operated over a wide range of temperatures. Those skilled in the art will recognize that there are great differences in the relative reactivity of various groups containing active hydrogen atoms, amines reacting faster than alcohols, primary alcohols reacting faster than tertiary alcohols—to name a few examples; accordingly, one will select a temperature at which the reaction occurs at a rate convenient for the purpose at hand. Preferably, the reaction temperature ranges between about 20° C. and 150° C. However, the temprature is not critical.

If desired, the reaction may be carried out in an inert solvent. Representative solvents include tetrahydrofuran, o-dichlorobenzene, chlorobenzene, xylene, methyl isobutyl ketone, toluene and ethyl acetate. In general, the solvent should be free from isocyanate-reactable groups such as groups bearing Zerewitinoff-active hydrogen atoms.

In the preparation of the polymers, a portion of the diisocyanates (i.e. up to about 90 mole percent and preferably from 0 to 50 mole percent can be replaced by known polyisocyanates. Representative of such known polyisocyanates are ethylenediisocyanate, hexamethylenediisocyanate, butylene-1,3-diisocyanate, ethylidene diisocyanate, butylidene diisocyanate, 1,2,4-butanetriisocyanate, 1,3,3-pentanetriisocyanate, p-phenylene-2,2'-bis(ethylisocyanate), 1,4-naphthalene-2,2'-bis(ethylisocyanate), 5-chloro phenylene-1,3-bis(propyl-3-isocyanate), tolylene diisocyanate, m-phenylene diisocyanate, p-phenylene diisocyanate, diphenylene-4,4'-diisocyanate, xylylene-1,4-diisocyanate, 4,4'-diphenylenemethanediisocyanate and the like. A particularly desirable group of polyisocyanates to be employed in combination with the instant diisocyanates in the preparation of the polymers are those described in the application of Rogier and Kamal, Ser. No. 250,211, filed Jan. 9, 1963, entitled "Polyisocyanates and Derivatives," now Pat. 3,455,883. These polyisocyanates are derived from polymeric fat acids and have the following idealized structural formula:

where $y$ is 0 to 1, $x$ is an integer of 2 to about 4 and $R^5$ is the hydrocarbon group of polymeric fat acids. Preferably, $x$ is 2. The polyisocyanates of the above formula wherein $y$ is 0 are prepared by converting the polymeric fat acids to the corresponding polymeric acid chlorides, reacting the acid chlorides with a metal azide to form the polymeric acyl azides and then heating the acyl azides to produce the polyisocyanates. The polyisocyanates wherein $y$ is 1 are prepared by converting the polymeric fat acids to the corresponding polynitriles and then hydrogenating the polynitriles in the presence of ammonia and a catalyst such as Raney nickel to form polyamines. The polyamines are then reacted with phosgene to give the polyisocyanates.

The following examples illustrate the preparation of polymers. The said examples are not to be considered as limiting.

EXAMPLE J

A mixture of 2.00 g. of the ether carbonate diisocyanate as prepared in Example E and 0.48 g. of the diketimine of diethylene triamine and methylisobutyl ketone was spread on glass with a 3-mil drawdown bar. The film became tack-free in about 3½ hours at 73° F. and 43% relative humidity. The coating was of good appearance.

EXAMPLES K, L and M

Coatings are prepared as in Example J using the diisocyanates of Examples F, G and H. Similar results are obtained. Where desired, elevated temperatures and/or catalysts such as dibutyl tin dilaurate can be used to accelerate the cure of the polymers.

It is to be understood that changes and variations may be made without departing from the spirit and scope of the invention as defined in the appended claims.

The embodiments of the invention in which an exclusive property or privilege is claimed are defined as follows:

1. A dinitrile selected from the group consisting of compounds having the formulae:

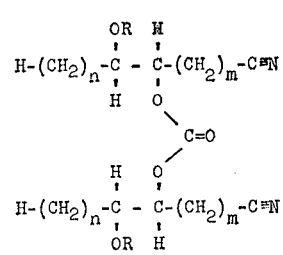

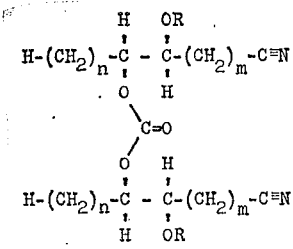

and

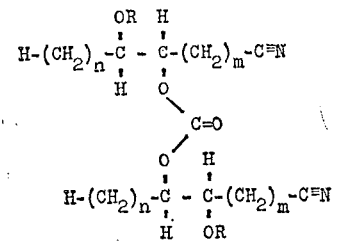

and mixtures thereof where $n$ is 4 to 19, $m$ is 0 to 15, the sum of $n$ and $m$ is 13 to 19 and R is a monovalent hydrocarbon radical selected from the group consisting of saturated aliphatic, phenyl, alkyl substituted phenyl, cycloaliphatic, alkyl substituted cycloaliphatic and aryl sub-substituted alkyl radicals which may contain inert substituents.

2. The dinitrile of claim 1 wherein the sum of $n$ and $m$ is 15.

3. The dinitrile of claim 1 wherein R contains 1 to about 20 carbon atoms.

4. The dinitrile of claim 1 wherein the sum of $n$ and $m$ is 15 and R contains 1 to about 20 carbon atoms.

5. The dinitrile of claim 1 wherein $n$ is 8 and m is 7.

6. The dinitrile of claim 1 wherein R is a saturated aliphatic radical of 1 to about 18 carbon atoms.

7. The dinitrile of claim 5 wherein R is methyl.

8. The dinitrile of claim 2 wherein R is

—$CH_2(CH_2)_6CH_3$

9. The dinitrile of claim 2 wherein R is

—$CH_2(CH_2)_{14}CH_3$

10. The dinitrile of claim 2 wherein R is phenyl.

References Cited

UNITED STATES PATENTS 2,755,264   7/1956   Riedeman _____ 260—30.4

LEWIS GOTTS, Primary Examiner

D. G. RIVERS, Assistant Examiner

U.S. Cl. X.R.

117—61; 260—18 TN, 47 CB, 47 EQ, 67 TN, 75 NT, 77.5 AP, 77.5 AT, 465.6